March 10, 1964  P. RUETSCHI  3,124,488
BATTERY VENTING MEANS
Filed Feb. 6, 1962

INVENTOR.
PAUL RUETSCHI 3,124,488
BATTERY VENTING MEANS
Paul Ruetschi, Yardley, Pa., assignor to The Electric Storage Battery Company, a corporation of New Jersey
Filed Feb. 6, 1962, Ser. No. 171,393
5 Claims. (Cl. 136—178)

The present invention relates to storage battery venting means. More specifically, the present invention is concerned with a new and improved means for preventing an undue build-up of pressure or vacuum within a storage battery.

While not limited thereto, the present invention is particularly adapted for utilization with storage batteries of the type which are operated under conditions which facilitate the recombination of gases evolved during operation, for in such batteries component failure, misuse, and the like may result in not only a dangerous build-up of pressure within the battery container, but also the build-up of a high vacuum. As will be apparent to those skilled in the art, either condition can result in a violent rupture of the container.

It has long been recognized as desirable to operate storage batteries in a sealed condition to facilitate their handling, prevent the leakage and loss of electrolyte, and to reduce battery maintenance. In order to operate a battery in a sealed condition, however, it is necessary to provide means for preventing an undue build-up of gas pressure within the cell container. To this end, auxiliary gas recombination elements have been used. In addition, it is known that under certain conditions batteries may be operated without undue build-up of gas pressure within the container by properly proportioning the electrochemical capacity of the electrodes with respect to each other and by operating the cell with a limited amount of electrolyte, the latter by content substantially within the pores of an absorbent separator and the battery electrodes. While such systems have proven to be satisfactory for well regulated battery service, it is known that when such a battery is subjected to severe conditions of overcharge and overdischarge that there still may result within the cell container a build-up of pressure which can cause the violent rupture thereof. In addition to the danger of a pressure build-up within a cell container there is also danger of the creation of a high vacuum within a cell container due to the uncontrolled recombination of the gases within the cell with the electrode active materials or with gas recombining elements if the latter are utilized. As noted before, such vacuum conditions can also cause rupture of the cell container.

It is therefor an object of the present invention to provide a new and improved means for maintaining a battery in a sealed condition until the build-up of a predetermined pressure or a predetermined vacuum within the container.

It is another object of the present invention to provide a battery venting means which is operable to be adjusted so that the pressure and vacuum at which the venting means will release the pressure or vacuum within the container may be regulated.

Still another object of the present invention is to provide a battery vent means of the type described which is characterized by simplicity of construction and reliability of performance.

These and other objects of the present invention are accomplished by means of a venting structure which may be an integral part of the cell container or adapted for use as a vent plug to be mounted in a battery vent opening. This construction comprises a body portion having a peripheral rim extending upward from the top thereof. A resilient cover which may be a semi-rigid plastic or rubber engages and mates with this rim and defines therewith a chamber which communicates with the interior of the cell container by means of a passage through the body of the venting device. The resilient cover is secured to the body by means of a fastening device such as a conventional threaded bolt which extends through a central opening in the cover and is threaded into the body of the venting device. This fastening member is provided with an outwardly extending head which engages and mates with the opening in the resilient cover. In this manner, a seal is created by the resilient cover and the upstanding peripheral rim and between the cover and the outwardly extending head of the fastening member. In operation, when sufficient pressure is built up within the cell container it may be vented safely to the atmosphere by deforming the resilient cover and breaking the seal between the cover and the rim. When conditions of vacuum exist these conditions may be relieved by atmospheric pressure deforming the cover and releasing the seal between the head of the fastening member and the cover in the area of the central opening. The pressures and vacuums at which these seals will be released may be varied by adjusting the tension exerted on the cover by the fastening means.

Further objects and advantages of the present invention will be readily apparent from the following detailed description thereof when read with reference to the accompanying drawing of which:

Figure 1:
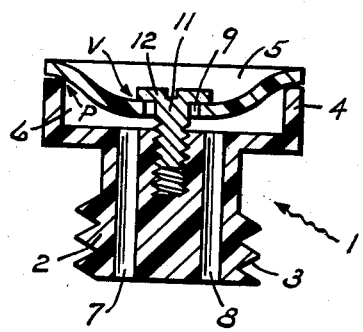
FIG. 1 is a vertical section of a vent plug in accordance with the present invention.

Referring now to FIG. 1, the numeral 1 generally indicates the vent plug in accordance with the present invention which may be made of plastic or other suitable electrolyte resistant material. The body of the vent plug 1 has a base portion 2 which is adapted to be secured in the vent opening of a storage battery cover by means of the threads 3. As will be understood by those skilled in the art, other suitable means of securing the vent plug 1 to a battery may be utilized. The upper portion of the vent plug 1 is provided with a peripheral upstanding rim 4 which conveniently may be circular in form. Overlying the top of the vent plug 1 and mating near its periphery with the upstanding rim 4 is a cover 5 which may be made of a resilient semi-rigid plastic or other suitable resilient material such as rubber which is also resistant to degradation by battery electrolyte. The cover 5, the rim 4, and the body of the vent plug 1 define a chamber 6 which, as will be apparent to those skilled in the art, is in communication to the interior of the battery to which the vent plug 1 is affixed by means of the vertical passages 7 and 8 which pass through the base portion 2 of the vent plug 1.

The cover 5 is provided with a central opening 9 which permits it to be fastened to the body of the plug 1 by means of the fastening means 11 which is shown here as a bolt threaded into the body of plug 1. The opening 9 may conveniently be circular in shape. As shown, the bolt 11 has a flat head 12 which extends outward beyond the periphery of the opening 9 in the cover 5 and has a shaft which is smaller than the opening 9. As the bolt 11 is tightened into the plug 1, the cover 5 is deformed and drawn tightly against the upstanding rim 4 forming a seal therebetween and also a seal around the opening 9 and the head 12 of the bolt 11.

In operation, pressure within the battery container will be exerted on the resilient cover 5 through the passages 7 and 8 and the chamber 6 and when this pressure is sufficient to deform the cover 5 the seal formed at the rim 4 will be broken thereby releasing the pressure within the cell as indicated by the arrow designated P. If vacuum conditions exist within the battery, atmospheric pressure acting on the cover 5 will deform the cover 5 breaking the seal between the cover 5 and the head 12 of the bolt 11 permitting a pressure equalization as indicated by the arrow designated V. The respective pressures and vacuums at which the seal maintained by the cover 5 will be released depends upon the resiliency of the cover 5 and the force exerted by the cover 5 on the rim 4 and the head 12 as a result of the deformation caused there in tightening of the bolt 11 into the body of the plug 1. Accordingly, the pressures and vacuums at which these seals will be broken may be varied by adjusting the tension placed on the cover by the bolt 11. As will be understood by those skilled in the art, while the bolt 11 has been shown here as being metallic, it to may be made of a plastic material inert to electrolyte and it does not have to be adjustable.

Figure 2:
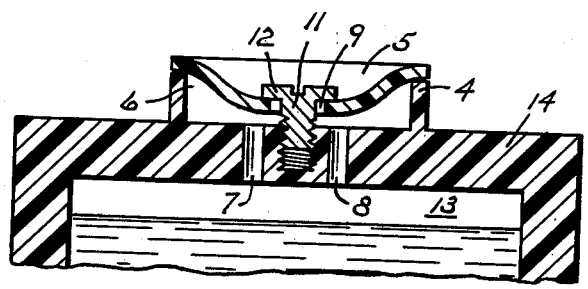
FIG. 2 is a vertical section of a battery container incorporating the venting means of the present invention.

Referring now to FIG. 2, there is shown an embodiment of the present invention in which the venting means has been made an integral part of a battery cover. Similar reference characters have been utilized to indicate structural features which are identical to those shown in FIG. 1. In this embodiment of the present invention, a battery cover 14 is provided with the upstanding rim 4 and also contains the vent passages 7 and 8 which communicate with the interior of the battery 13. Again as in FIG. 1 the cover 5 is held against the rim 4 by means of a bolt 11 which is threaded directly into the cover 14. As shown, the bolt 11 has a head 12 which extends outward from the shaft of the bolt to engage the cover 5 beyond the periphery of the central opening 9. The operation of this venting arrangement is identical to that described in connection with FIG. 1.

Figure 3:
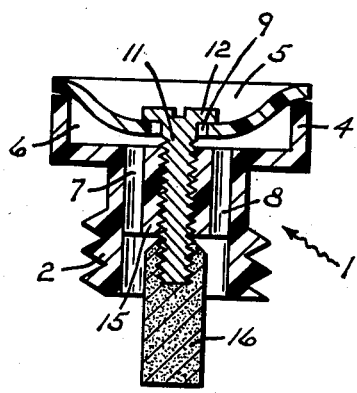
FIG. 3 is a vertical section of a modification of the vent plug shown in FIG. 1 which is adapted for the mounting of a gas recombining element.

Referring now to FIG. 3, there is shown a modification of the vent plug shown in FIG. 1 which is adapted for the mounting of a gas consuming auxiliary electrode. Once again, similar reference characters have been employed to designate construction features similar to those shown in the other figures. In this embodiment of the present invention, the central portion of the body 2 of the vent plug 1, as defined by the area between the vent passages 7 and 8 has a threaded opening for the bolt 11 which extends completely therethrough. In addition, the bolt 11 when tightened to provide an operating tension upon the cover 5 extends through the central portion 15 of the plug. A gas recombining element 16 is threaded to the bolt 11 where it extends beyond the central portion 15 of the vent plug 1. The gas recombining element 16 may advantageously comprise a porous electrically conductive graphite element activated with silver or a metal element of the platinum group and is preferably waterproofed as by means of a surface impregnation by an emulsion of a hydrophobic thermoplastic resin such as tetrafluoroethylene. The details of the construction of such a material is described in my Patent No. 2,951,106, issued August 30, 1960. Electrical connection to the gas recombining element 16 may be made by way of the head 12 of the bolt 11 which is in electrical contact therewith. As will be understood by those skilled in the art, unless other means of making an electrical connection to the gas recombining element 16 are provided, the cover 5 must be secured to the body 2 of the vent plug 1 by means of a graphite or metallic screw.

In view of the foregoing, it can be readily seen that by means of the straightforward non-complex structure described there is provided a unique means for preventing the dangerous build-up of pressure within a battery container, as well as the build-up of a high vacuum therein. In the absence of such a build-up, however, the venting means of the present invention is readily operable to maintain a battery in a sealed condition thereby to prevent the loss of electrolyte therefrom.

Having described the invention, that which is claimed as new is:

1. A venting means for a storage battery comprising a body having a first surface in communication with the interior of the battery and a second surface in communication with the atmosphere, a peripheral rim extending outward from said second surface of said body, a resilient cover engaging said rim and defining with said rim and said body a chamber, at least one passage communicating said chamber with the interior of said battery through the first surface of said body, a central opening in said cover, and means for fastening said cover to said body, said fastening means comprising a shaft extending through said opening and an outwardly extending head engaging said cover around said opening, said shaft being smaller than said opening, said fastening means in the absence of a predetermined internal pressure within said battery holding said cover in a sealed relationship with said rim and in the absence of a predetermined vacuum within said battery holding said cover in a sealed relationship with said head.

2. A storage battery vent plug comprising, in combination, a body portion adapted to be secured to a battery, a peripheral rim extending upward from the top of said body portion, a resilient cover engaging said rim and defining a chamber with said rim and said body portion, at least one passage communicating said chamber with the base of said body portion, a central opening in said cover, and fastening means for said cover extending through said opening and engaging said body portion, said fastening means comprising a shaft smaller than said opening and an outwardly extending head engaging said cover around said opening, said fastening means, in the absence of a predetermined internal pressure within said battery, holding said cover in a sealing relationship with said rim and, in the absence of a predetermined vacuum within said battery, holding said cover in a sealing relationship with said head.

3. A storage battery vent plug comprising, in combination, a body portion adapted to be secured to a battery, a circular peripheral rim extending upward from the top of said body portion, a resilient cover engaging said rim and defining a chamber with said rim and said body portion, at least one passage communicating said chamber with the base of said body portion, a central circular opening in said cover, a bolt having a shaft smaller than said opening and a head having a flat under-surface larger than said opening said bolt extending through said opening and engaging said body portion in a threaded relationship and exerting an adjustable tension on said resilient cover, said bolt in the absence of a predetermined internal pressure within said chamber holding said cover in a sealed relationship with said rim and in the absence of a predetermined vacuum within said chamber holding said cover in a sealed relationship with said head.

4. Vent plug as specified in claim 3 wherein said bolt extends through the body of said vent plug and a gas recombining element is attached thereto.

5. A storage battery vent plug comprising, in combination, a body portion adapted to be secured to a battery, the bottom of said body portion having a central recess, a peripheral rim extending upward from the top of said body portion, a resilient cover engaging said rim and defining a chamber with said rim and said body portion, at least one passage communicating said chamber with the base of said body portion, a central opening in said cover, fastening means for said cover extending through said opening and engaging said body portion, said fastening means comprising a shaft smaller than said opening and an outwardly extending head engaging said cover around said opening, said fastening means, in the absence of a predetermined internal pressure within said battery, holding said cover in a sealing relationship with said rim and, in the absence of a predetermined vacuum within said battery, holding said cover in a sealing relationship with said head, the shaft of said fastening means extending through said body portion into said central recess, and a gas recombining element affixed to said shaft in said central recess.

References Cited in the file of this patent

UNITED STATES PATENTS

| | | |
|---|---|---|
| 2,016,278 | Ehlers | Oct. 8, 1935 |
| 2,389,266 | Marr | Nov. 20, 1945 |
| 2,516,084 | Wells | July 18, 1950 |
| 2,743,841 | Buegel | May 1, 1956 |